United States Patent [19]

Cusanelli et al.

[11] 4,168,155
[45] Sep. 18, 1979

[54] PROCESS FOR SMELTING LEAD REFINERY DROSS

[75] Inventors: Dominic C. Cusanelli, South Plainfield; William R. Opie, Holmdel; Michael Yavorsky, Carteret, all of N.J.

[73] Assignee: Amax, Inc., Greenwich, Conn.

[21] Appl. No.: 889,866

[22] Filed: Mar. 24, 1978

[51] Int. Cl.$^2$ .................. C22B 4/04; C22B 13/06
[52] U.S. Cl. .................. 75/10 R; 75/44 S; 75/77
[58] Field of Search .................. 75/10 R, 44 S, 77, 78

[56] References Cited

U.S. PATENT DOCUMENTS

| 3,395,010 | 7/1968 | Shoeld | 75/77 |
| 4,030,916 | 6/1977 | Liniger | 75/77 |

OTHER PUBLICATIONS

C. Hayward, "How to Smelt Battery-Plate Scrap", Engineering and Mining Journal, pp. 80-83, vol. 145, No. 3, (Mar., 1944).

Primary Examiner—P. D. Rosenberg
Attorney, Agent, or Firm—Michael A. Ciomek

[57] ABSTRACT

Lead refining drosses are fed to a furnace containing molten slag that is heated to at least about 1200° C. by the resistance to electric current flowing between at least two electrodes immersed in the slag. The drosses are smelted to separate matte and metal phases which are tapped from the furnace.

The process is particularly advantageous for smelting drosses containing significant amounts of nickel or cobalt and arsenic which react to form speisses. The speisses have densities between that of the matte and the metal and melting points that are high compared to the matte and metal. Resistance heating of the slag insures that any speiss formed is maintained in the molten state thereby minimizing precipitation of the speiss on the furnace walls.

9 Claims, No Drawings

PROCESS FOR SMELTING LEAD REFINERY DROSS

BACKGROUND OF THE INVENTION

The present invention relates to the treatment of lead drosses and, more particularly, to the pyrometallurgical treatment of nickeliferous and cobaltiferous lead drosses.

Most lead ores contain significant amounts of arsenic and antimony in addition to other impurities. Lead bullion is produced by roasting the ores and then smelting the roasted ore in a blast furnace. Molten lead bullion from the furnace is charged to primary drossing kettles in which oxides and other insolubles float to the surface of the molten lead at a later stage. Sulfur is then added to the partially drossed molten lead to form sulfides of copper, and other impurities. During this so-called decopperizing stage the molten lead is stirred to insure complete reaction between the sulfur and the copper. Once the decopperizing reactions are completed the sulfides formed are allowed to float to the surface of the bath, and the refined lead bullion and the sulfur dross are then separated. The sulfide dross obtained in this stage can be recycled to either the blast furnace or to the primary drossing kettles but in either case the dross from the primary drossing kettles is conventionally smelted in a reverberatory furnace to recover additional amounts of lead and to recover copper and other metals in the form of matte and/or speiss which can be treated by copper smelters.

Lead ores mined in the southeastern portion of Missouri are unusual in that they contain significant quantities of nickel and cobalt as well as arsenic and copper. These characteristics of southeastern Missouri lead ores cause problems in the treatment of the lead refining kettle drosses resulting therefrom. The presence of significant quantities of nickel and cobalt result in the formation and the precipitation on the furnace sidewalls of high melting point nickel-and cobalt-containing speisses. The continual buildup of these deposits in a conventional dross smelting furnace, such as a reverberatory furnace, gradually reduces the capacity of the furnace and ultimately forces furnace shutdown for removal of the deposit.

BRIEF SUMMARY OF THE INVENTION

The present invention relates generally to an improved process for treating lead refining drosses. A molten slag layer is established in an electric furnace and is heated to at least about 1200° C. by a submerged arc. Lead dross is charged into the furnace and is rapidly smelted to separate lead and matte phases. Subsequently the lead and matte are tapped from the furnace for appropriate recovery or recycling.

DETAILED DESCRIPTION

Although the process in accordance with the present invention can be employed to treat lead drosses from all sources, the invention will be described with reference to nickeliferous and cobaltiferous copper drosses containing arsenic. Typical compositions of copper drosses that can be treated by the process in accordance with the present invention contain between about 60% and about 65% lead, between about 10% and about 16% copper, between about 0.5% and about 4.0% iron, between about 4% and about 8% sulfur, between about 1% and about 3% nickel, between about 0.2% and about 0.3% cobalt and small amounts of arsenic, e.g. about 0.3%.

Drosses falling within the foregoing ranges are mixtures of oxides and sulfides and contain substantial amounts of mechanically entrained metallic lead. The pyrometallurgical treatment of these drosses has as its primary goal the recovery of additional lead bullion, which is recylced to the lead refining kettles. Secondary goals include the production and separation of matte and speiss phases from each other and from the lead bullion and the slagging of oxidized constituents. The matte can be treated for the separate recovery of lead and copper, and the speiss can be treated for nickel and cobalt recovery.

Lead refining drosses are smelted by being continuously charged to a furnace containing a molten slag heated to a temperature of at least about 1200° C., and advantageously between about 1200° C. and about 1300° C. Advantageously, the dross is charged to the surface of the heated slag. Charging the dross to the heated slag surface insures its rapid heating to the required temperatures because the slag layer concentrates the heat and as the dross is smelted the products of smelting settle through the slag as small droplets. The droplets having high surface area to volume and at high temperatures are efficiently washed and reacted as they pass through the slag, matte and speiss with the sulfides being collected in the matte, arsenides in the speiss and lead in the molten metal.

Primary drosses of the character described above are treated in a submerged arc furnace, preferably a three phase electric furnace, because such a furnace facilitates maintaining the slag layer at a temperature of at least about 1200° C. Such a furnace may comprise a furnace shell lined with a suitable refractory brick and because heating is done electrically, and because flame reach is not a consideration, the furnace can be rectangular, square or even circular. Furthermore, operation with electric resistance heat developed in the slag results in a lower roof temperature than if a flame is used as in a reverbatory type furnace. Suitable holes or glands are provided for insertion of carbon or graphite electrodes to carry electric current to the inert heating medium that is the slag layer. The furnace can have two or more tapholes at different vertical levels for eventually separately tapping slag, lead bullion, and the mixed matte and speiss phases.

As noted hereinabove, dross is charged to the heated slag surface. Other than fluxing minor amounts of oxidized elements, the flux or slag is essentially chemically inert in the process and acts primarily as a heating medium. Because the present invention is best carried out in a submerged arc furnace, the slag must have certain physical characteristics. The slag should have a sufficiently high electrical resistivity such that electric current flowing between the submerged electrodes will heat the slag but not be so high as to induce instability into the operation of the furnace. The slag is advantageously sufficiently viscous that passage of charged dross through the slag is sufficiently impeded to provide a residence period long enough to insure the dross is both smelted and heated to a temperature of at least about 1200° C. before the dross reaches the intermediate matte and speiss phases. Exemplary compositions of slag meeting these criteria contain between about 20% and about 25% $SiO_2$, between about 15% and about 20% CaO, between about 5% and about 7% MgO and between about 20% and about 40% FeO.

Although the smelting of the dross is principally a melting operation, some reduction of oxidized metal values (principally lead) does occur. In the absence of any reducing reagent, reduction would be effected by the carbon in the electrodes of the furnace thereby accelerating the electrode consumption. Therefore, it is advantageous to add small amounts of reductants, such as coal or coke, to the slag to minimize electrode consumption. The amount of reductant, should not, however, be so great that significant amounts of components of the slag, such as ferrous oxide, are reduced and that the physical characteristics of the slag are materially altered.

In most instances, reductants in amounts equivalent to coke additions between about 1% and about 3% and preferably about 2%, based on the weight of the charged dross, are added to the slag or to the dross as it is being charged to the slag.

In carrying the present invention into practice, a three-phase submerged arc electric furnace is charged with a sufficient quantity of premelted slag so as to provide a molten slag layer of no less than about 6 inches to insure that the electrodes have sufficient contact area with the slag layer to supply the requisite current for heating without immersing the electrode so deep in the slag layer that a short circuit between the highly conductive underlying matte layer and the electrode is formed.

After the furnace is charged with molten slag, the electrodes are lowered into the slag bath and the bath is heated to a temperature of at least about 1200° C. by passage of electric current between the electrodes and through the slag. In order to provide commercially attractive throughput rates, to insure proper separation of the lead bullion and to minimize the precipitation of metals on the furnace refractory, the slag is advantageously heated to a temperature between about 1200° C. and about 1300° C., and most advantageously to between about 1250° C. and about 1300° C. Dross is then charged to the molten slag layer at a suitable spot depending upon the configuration of the furnace electrodes. In the simplest case when three electrodes are being used that configuration may be triangular which is especially suited to square or round furnace shells or in-line which is a suitable configuration for a more rectangular-shaped furnace structure. Advantageously, the electrode configuration is triangular and the dross is charged to the area between the legs of the triangle. Advantageously, the dross is charged incrementally at such a rate that the slag layer is maintained at a temperature of at least about 1200° C.

When the lead bullion and matte phases reach predetermined levels, the appropriate tapholes can be opened, and lead bullion and mixed matte and speiss phases can be separately recovered.

In order to give those skilled in the art a better understanding of the present invention the following illustrative examples are given:

EXAMPLE I

Smelting of lead kettle dross was conducted in a single phase, double electrode (graphite electrodes measuring 2.5 inches in diameter) 100 KVA electric arc furnace of approximately 5 square feet hearth area.

A slag bath of 50% sand and 50% limestone was melted and heated to a temperature of 1250° C. A lead dross containing 5% copper was added to the furnace in 10 to 15 pound increments until 200 pounds of dross were smelted. Under these conditions the furnace performed satisfactorily.

The results, shown in Table I, confirm good metal recovery from the lead dross.

EXAMPLE II

The slag resulting from Example I was maintained at a temperature of 1250° C. in the same furnace described in Example I. A lead dross from the same lot treated in Example I was charged to the furnace in 10 to 15 pound increments until a total of 500 pounds was charged. The results given in Table I again confirm good metal recovery.

The results shown in Examples I and II demonstrate that the process in accordance with the present invention can be used for all lead drosses.

EXAMPLE III

Using the slag from Example II the procedure described in Example I was repeated on a lead dross containing 17.0% copper, 0.8% nickel, 50% lead and 4.0% iron was charged to the furnace in 10 to 15 pound increments until a total of 200 pounds was charged.

EXAMPLE IV

Example III was repeated except a total of 500 pounds of the dross was charged to the furnace. The combined results of Examples III and IV are given in Table I.

EXAMPLE V

Slag, matte and metal from the previous examples were melted to form a bath 6 inches deep and the slag was heated to a temperature about 1250° C. Lead dross analyzing 25.0% copper, 2.0% nickel, 52% lead and 1.2% iron was incrementally charged to the furnace until a total of 728 pounds had been charged and formed a bath between 11 and 12 inches deep. The furnace was then tapped and the results are reported in Table III.

EXAMPLE VI

Example V was repeated and when the bath depth reached 12 inches the furnace was tapped lowering the bath to 3 to 4 inches. Charging was resumed until a total of 1400 pounds had been charged. The results are reported in Table I.

EXAMPLE VII

A lead blast furnace slag containing 23%, $SiO_2$, 16% CaO, 29% FeO, 4% Pb, 11% Zn, 0.2% As, 0.15% Co and 0.02% Ni was premelted and charged to the furnace described in Example I. Coke was added to the dross charge in an amount of 2% of the weight of dross. The dross analyzed 17% copper, 0.7% nickel, 54% lead, 1% iron and 8% sulfur. When 700 pounds of dross had been charged to the furnace, the furnace was tapped and thereafter charging was resumed until another 700 pounds of dross were charged to the furnace. The results are reported in Table I.

TABLE I

| Example No. | Total Dross Smelted Lbs. | Recovery as % of Original Dross | | | % Metal Recoveries as: | | | | |
|---|---|---|---|---|---|---|---|---|---|
| | | Matte/Speiss | Metal | Oxide | Mixed Matte and Speiss | | | Metal | Oxide |
| | | | | | Cu | Ni | Pb | Pb | Pb |
| 1 | 200 | 11.0 | 35.2 | 16.5 | 69 | — | — | — | — |
| 2 | 500 | 13.6 | 34.4 | 8.0 | 85 | — | — | — | — |
| 3 and 4 | 700 | 39.1 | 26.6 | 8.5 | 93 | 66 | 27 | 51 | 10.5 |
| 5 | 728 | 63.0 | 22.0 | 6.6 | 94 | 75 | 38 | 53 | 3.9 |
| 6 | 1400 | 66 | 22 | 4.6 | 99 | 92 | 49 | 42 | 5.5 |
| 7 | 1400 | 44 | 32 | 7.5 | 98 | 96 | 33 | 60 | 7 |

The foregoing Examples, particularly Examples 6 and 7, demonstrate that substantially all the nickel values contained in the dross feed are recovered in this mixed matte and speiss phase. Recovery of nickel values in this phase insures that little or no nickel will precipitate from the lead bullion phase and the problems associated with such precipitation are thereby avoided.

It will be noted that the foregoing examples dealt with an intermediate mixed matte and speiss phase. If the dross contains substantial greater quantities of arsenic, a separate speiss phase is formed and nickel and cobalt values would be concentrated therein. The presence of the separate speiss phase, however, does not alter the principles or the operation of the process.

All compositions given herein are on a weight basis unless otherwise stated.

The present invention has been described in terms of advantageous embodiments. However, those skilled in the art will recognize that various modification and variations may be resorted to without departing from the scope of the present invention. Such modifications and variations are considered to be within the purview and scope of the invention and appended claims.

We claim:

1. A process for smelting lead sulfide drosses which comprises charging to an electric arc furnace a molten flux having a sufficiently high electrical resistivity that electric current flowing between submerged electrodes heats the flux but not so high a resistivity as to induce instability in the operation of the furnace, heating the flux by a submerged arc to a temperature above about 1200° C., and feeding lead sulfide dross to the furnace to smelt the dross to matte and metal phases which are tapped from the furnace.

2. The process as described in claim 1 wherein the lead sulfide dross contains at least one metal selected from the group consisting of nickel and cobalt and arsenic which metal and arsenic react to form a speiss having a melting point higher than the matte and metal phases.

3. The process as described in claim 2 wherein the dross contains between about 60% and about 65% lead, between about 10% and about 16% copper, between about 0.5% and about 4% iron, between about 4% and about 8% sulfur, between about 1% and about 3% nickel and between about 0.2% and about 0.3% cobalt and small amounts of arsenic.

4. The process as described in claim 1 wherein the flux is heated to a temperature between about 1200° C. and about 1300° C.

5. The process as described in claim 4 wherein the flux is heated to a temperature between about 1250° C. and about 1300° C.

6. The process as described in claim 1 wherein the flux contains between about 20% and 25% $SiO_2$, between about 15% and 20% CaO, between about 5% and about 7% MgO and between about 20% and about 40% FeO.

7. The process as described in claim 1 where a reductant in an amount equivalent to a coke addition between about 1% and about 3%, based on the weight of the charged dross, is added to the flux.

8. The process as described in claim 1 wherein the lead sulfide dross is added to the surface of the molten flux.

9. The process for smelting lead sulfide dross which contains arsenic and at least one metal selected from the group consisting of nickel and cobalt which process comprises charging to an electric arc furnace a molten flux having sufficiently high electric resistivity that electric current flowing between submerged electrodes heats the flux but not so high a resistivity as to induce instabilities in the operation of the furnace, heating the flux by a submerged arc to a temperature above about 1200° C. and feeding the lead sulfide dross to the furnace to smelt the dross to matte and metal phases which are tapped from the furnace.

* * * * *